(12) United States Patent
Kauker et al.

(10) Patent No.: US 8,648,918 B2
(45) Date of Patent: Feb. 11, 2014

(54) METHOD AND SYSTEM FOR OBTAINING A POINT SPREAD FUNCTION USING MOTION INFORMATION

(75) Inventors: Daniel Kauker, Stuttgart (DE); Muhammad Siddiqui, Esslingen (DE); Klaus Zimmermann, Deizisau (DE)

(73) Assignee: Sony Corporation, Tokyo (JP)

( * ) Notice: Subject to any disclaimer, the term of this patent is extended or adjusted under 35 U.S.C. 154(b) by 359 days.

(21) Appl. No.: 13/020,496

(22) Filed: Feb. 3, 2011

(65) Prior Publication Data

US 2011/0199492 A1 Aug. 18, 2011

(30) Foreign Application Priority Data

Feb. 18, 2010 (EP) ..................................... 10153932

(51) Int. Cl.
*H04N 5/228* (2006.01)
*G06K 9/40* (2006.01)
(52) U.S. Cl.
USPC ................ 348/208.6; 348/208.99; 348/208.2; 348/208.4; 348/222.1; 382/254; 382/255
(58) Field of Classification Search
USPC ............ 348/208.99–208.16, 222.1, 241–251, 348/333.01–333.13; 382/254–275
See application file for complete search history.

(56) References Cited

U.S. PATENT DOCUMENTS

| 6,822,758 | B1* | 11/2004 | Morino ........................... 358/1.9 |
| 8,396,320 | B2* | 3/2013 | Allebach et al. ............... 382/274 |
| 2003/0002746 | A1 | 1/2003 | Kusaka |
| 2006/0110147 | A1 | 5/2006 | Tomita et al. |
| 2006/0119710 | A1 | 6/2006 | Ben-Ezra et al. |
| 2006/0125938 | A1 | 6/2006 | Ben-Ezra et al. |
| 2007/0009169 | A1 | 1/2007 | Bhattacharjya |
| 2008/0100716 | A1 | 5/2008 | Fu et al. |
| 2008/0120056 | A1 | 5/2008 | Haino et al. |
| 2008/0166114 | A1 | 7/2008 | Engstrom |
| 2009/0123141 | A1 | 5/2009 | Li et al. |
| 2009/0147090 | A1 | 6/2009 | Miki |
| 2009/0154823 | A1 | 6/2009 | Ben-Ezra et al. |
| 2009/0174782 | A1* | 7/2009 | Kahn et al. ................. 348/208.2 |
| 2009/0190851 | A1* | 7/2009 | Chien et al. .................... 382/255 |
| 2010/0002086 | A1 | 1/2010 | Chien et al. |
| 2010/0074520 | A1* | 3/2010 | Kinoshita ..................... 382/167 |
| 2011/0096177 | A1* | 4/2011 | McCloskey .............. 348/207.11 |

OTHER PUBLICATIONS

Communication pursuant to Article 94(3) EPC issued Apr. 16, 2012, in Application No. 11 153 999.5-2218.

(Continued)

*Primary Examiner* — Michael Osinski
(74) *Attorney, Agent, or Firm* — Oblon, Spivak, McClelland, Maier & Neustadt, L.L.P.

(57) ABSTRACT

The present invention relates to a method and system for obtaining a point spread function for deblurring image data captured by an imaging device comprising a motion sensor. First, motion path values indicating the motion of the imaging device during the exposure time are acquired. The motion path values of the imaging device are then projected onto the sensor plane and for each sensor pixel the projected motion path values are integrated over time. Said integrated value represents for each sensor pixel an initial estimate of the point spread function. Optionally, the size of the point spread function can also be estimated based on the distance of the focused object and taken into account during the projecting step.

14 Claims, 4 Drawing Sheets

(56) References Cited

OTHER PUBLICATIONS

Ken Rockwell, "Practical Design Considerations for Modern Photographic Optics", Current Developments in Lens Design and Optical Engineering X, Proc. of SPIE vol. 7428, No. 742804, XP040500831, Aug. 3, 2009, pp. 742804-1-742804-7.

Extended European Search Report issued Jun. 20, 2011, in Patent Application No. 11153999.5.

Moshe Ben-Ezra, et al., "Motion Deblurring Using Hybrid Imaging", IEEE Computer Society Conference on Computer Computer Vision and Pattern Recognition, vol. 1, No. 1, 2003, pp. 1-8.

Canon, "Powershot A590 IS Digital Camera", URL: http://www.cameratown.com/cameras/detail_page_sql.cfm?ProductID=2462B001&cid=7, 2008, 2 pages.

* cited by examiner

METHOD AND SYSTEM FOR OBTAINING A POINT SPREAD FUNCTION USING MOTION INFORMATION

CROSS-REFERENCE TO RELATED APPLICATIONS

The present application claims priority of European patent application 10 153 932.8 filed on Feb. 18, 2010.

FIELD OF THE INVENTION

The present invention relates to the field of estimating a point spread function. More specifically, the present invention relates to a method and system for obtaining point spread function for deblurring image data using motion information, to a computer program product for performing the steps of the method and to an imaging device comprising such a system.

BACKGROUND OF THE INVENTION

When an image is captured by an imaging device, for example a camera, the image does not represent a single instant of time but it represents the scene over a period of time. So due to a relative movement between the object and the camera, the image will be blurred. Motion blur often happens due to unsteady hand movement so that the image will be smeared along the direction of relative motion.

Due to a longer exposure time, e.g. in low light conditions, the corresponding picture can be blurred due to handshaking or other motion of the imaging device during the captured time. To properly deblur the taken image is important to create a point spread function with correct values.

The estimation of the point spread function thus can be complex or may lead to insufficient results, which do not lead to a good deblurring result.

BRIEF SUMMARY OF THE INVENTION

It is therefore the objective problem of the present invention to improve the prior art. Specifically, it is the object of the present invention to reduce the problems posed by prior art.

More specifically, it is an object of the present invention to provide a possibility of obtaining an improved point spread function based on motion information, thereby using an estimation which is less complex and yields to more accurate values compared with prior art estimation.

According to an aspect of the present invention there is provided a method for obtaining a point spread function for deblurring image data captured by an imaging device comprising a motion sensor,
the method comprising the steps of
acquiring motion path values indicating the motion of the imaging device during the exposure time,
projecting the motion path values of the imaging device onto the sensor plane, and integrating for each sensor pixel the projected motion path values over time,
said integrated value for each sensor pixel representing an initial estimate of the point spread function.

According to another aspect of the present invention there is provided a computer readable non-transitory medium having instructions stored thereon which, when carried out on a computer, cause the computer to perform the steps of the method as presented according to an aspect of the present invention.

According to still another aspect of the present invention there is provided a system for obtaining a point spread function for deblurring image data,
said system comprising
a motion sensor for acquiring motion path values indicating the motion of the system during the exposure time,
a projecting unit for projecting the motion path values of the system onto the sensor plane, and
an integrating unit for integrating for each sensor pixel the projected motion path values over time, said integrated value for each sensor pixel representing an initial estimate of the point spread function.

According to still another aspect of the present invention there is provided an imaging device, in particular a camera, comprising a system for noise reduction according to an aspect of the present invention.

According to still another aspect of the present invention there is provided a system for obtaining a point spread function for deblurring image data captured by an imaging device comprising a motion sensor,
said system comprising
means for acquiring motion path values indicating the motion of the imaging device during the exposure time,
means for projecting the motion path values of the imaging device onto the sensor plane, and
means for integrating for each sensor pixel the projected motion path values over time,
said integrated value for each sensor pixel representing an initial estimate of the point spread function.

Further features and advantages are set out in the dependent claims.

BRIEF DESCRIPTION OF THE DRAWINGS

The present invention will now be explained in more detail in the following description of the preferred embodiments in relation to the enclosed drawings in which.

DETAILED DESCRIPTION OF THE INVENTION

According to the present invention a motion sensor is integrated into the imaging device so that the motion, e.g. handshake, movement or the like of the imaging device itself during the exposure time can be measured. This motion information is used to calculate a correct point spread function. Specifically, the present invention proposes a specific method of obtaining the point spread function based on the motion information.

Preferably according to the present invention further the size of the point spread function is estimated and also used when determining the correct point spread function.

Figure 1:
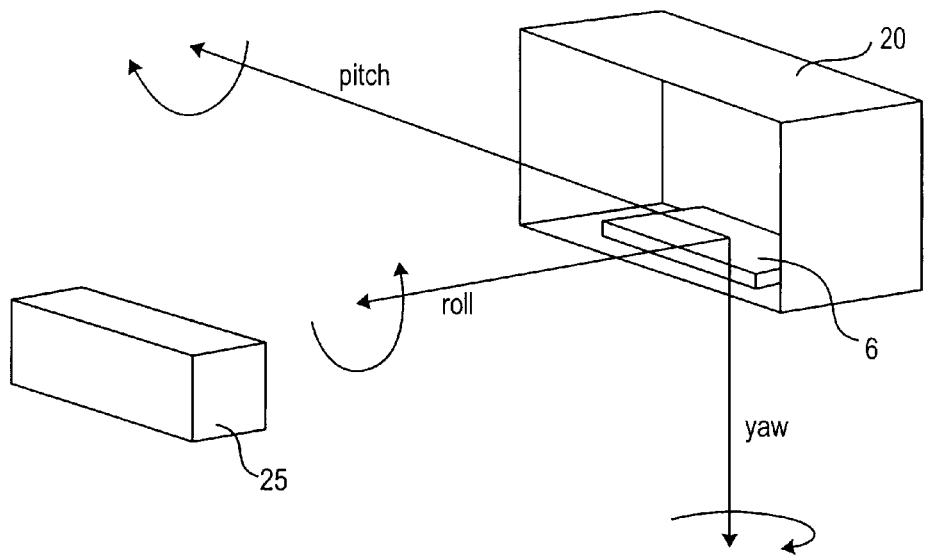
FIG. 1 shows a schematic view of an imaging device comprising a system according to the present invention.

FIG. 1 shows a schematic view of an imaging device 20 comprising an image sensor 6. FIG. 1 is hereby intended to explain a preferred embodiment of the present invention, where the motion of the imaging device 20 during the exposure time is measured as motion along the pitch axis and the yaw axis. Hereby, according to the model assumed for the preferred embodiment, the roll axis lies in the plane of the image sensor 6. When taking an image of an object 25 in front of the imaging device 20, a motion sensor (not shown in FIG. 1) will collect data indicating the motion along the pitch axis and the yaw axis.

FIG. 1 hereby indicates one possible embodiment. However, it is of course possible that instead of a pitch-yaw-roll-coordinate system also any other type of coordinate system can be used. It is further also possible to change the position of the sensor 6 within the imaging device 20 and to adapt the measurements of the motion along the axes accordingly.

In the following description of the present invention, reference will be made to the axes and the motion measurements as explained with reference to FIG. 1. For this purpose, a motion sensor is integrated into the system according to the present invention, which gathers motion information along the pitch axis, as well as along the yaw axis. Alternatively, two separate motion sensors can be provided, each recording motion along a difference axis. The motion hereby preferably is recorded along two axes, but can also be recorded along two or more axes.

Figure 2:
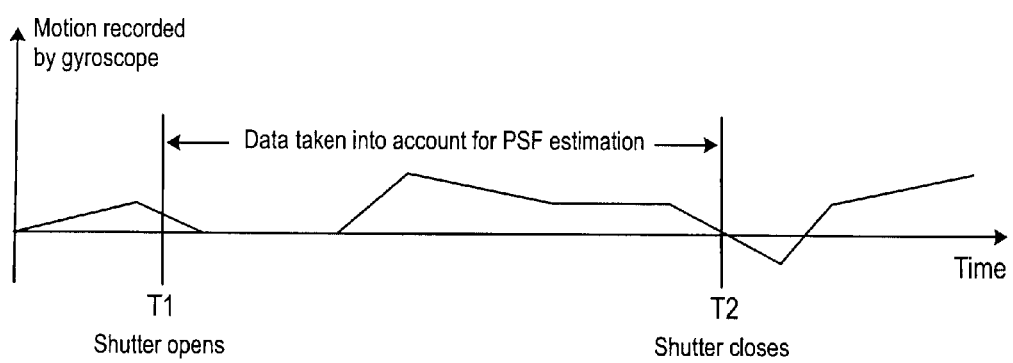
FIG. 2 shows a diagram with data taken by a motion sensor of the imaging device.

An example for such recorded motion detection data is for example shown in FIG. 2. FIG. 2 shows a diagram, where on the X-axis the time is shown and on the Y-axis the motion detection data are shown, whereby in the example in FIG. 2 it is motion data recorded by a gyroscope.

Also indicated in FIG. 2 is the time T1, where the shutter opens and the time T2, where the shutter closes. Even though the motion data are collected over a time going beyond the exposure time, only the data between the time points T1 and T2, i.e. only the data during the exposure time are taken into account for the estimation of the point spread function (PSF).

Figure 3:
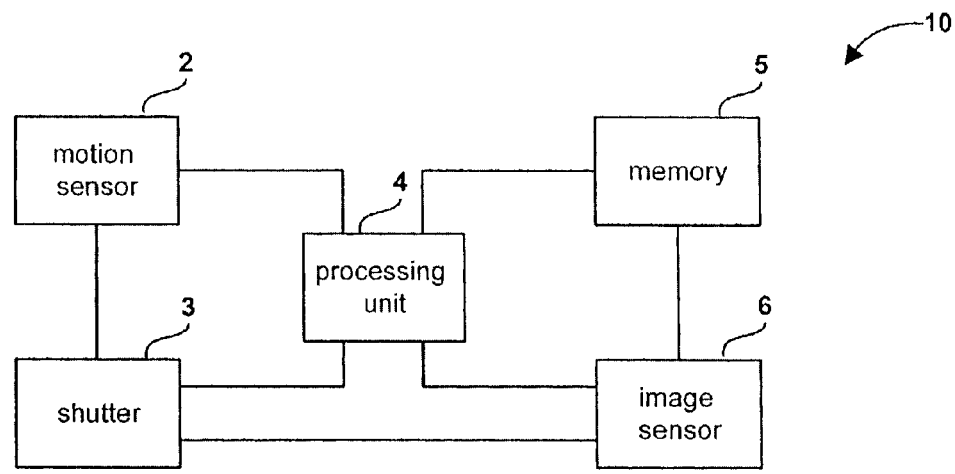
FIG. 3 is a schematic block diagram of components within the system according to the present invention.

With reference to FIG. 3 now schematically components of the system 10 will be described. The system 10 according to the present invention comprises a motion sensor 2, which is adapted to measure motion of the system 10 along at least one axis. Since the system 10 is preferably integrated into an imaging device, the motion sensor 2 measures the motion of the imaging device.

As previously explained, any type of coordinate system can be used and accordingly the motion information can be indicated in degrees, a parameter indicating length or the like. The motion sensor 2 can be any type of motion measurement means, such as a gyroscope, an accelerometer, magnetic sensors or the like. In a preferred embodiment of the present invention the motion sensor 2 is a gyroscope which is adapted to collect motion data along the pitch axis and the yaw axis within a pitch-yaw-roll-coordinate system.

The system 10 further comprises a shutter 3, which is adapted to open and close in order to define the exposure time. When the shutter is open, image data are captured and acquired by the image sensor 6. The motion sensor 2 hereby is physically mounted together with the shutter 3 and the image sensor 6, and is triggered together with the shutter 3, so that motion information is recorded during the complete exposure time.

The system 10 further comprises a memory 5 for storing any type of data, program information and the like. The motion sensor 2, the shutter 3, the memory 5 and the image sensor 6 are all connected to the processing unit 4, which controls and supervises all functionalities within the system 10. The processing unit 4 can comprise one or more CPUs, or any other type of control unit.

The system 10 is preferably integrated into an imaging device 20, so that during the exposure time the motion data can be recorded.

Figure 4:
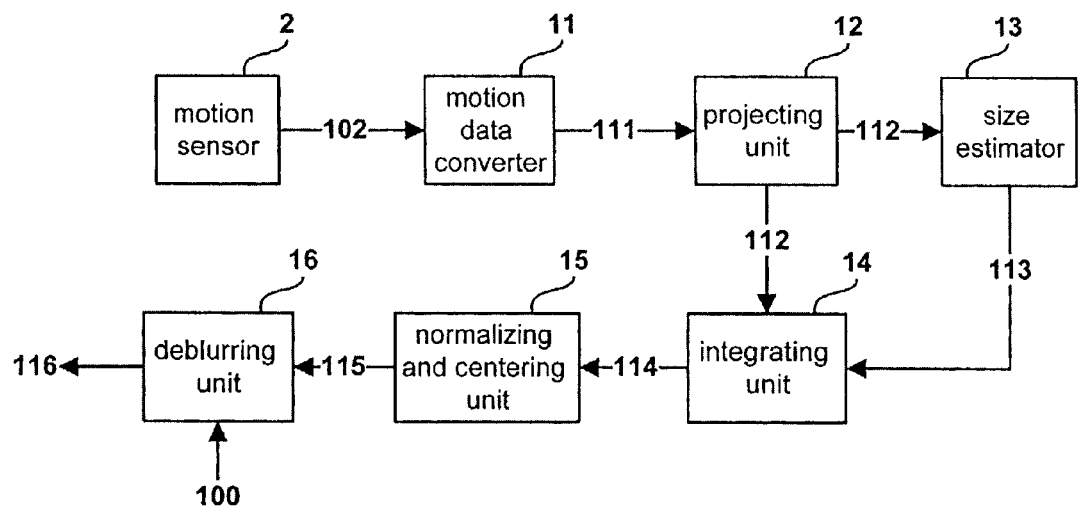
FIG. 4 is a further block diagram with additionally components of the system according to the present invention.

In the following with reference to FIG. 4 further components of the system 10 according to the present invention will be explained. The system comprises, as already explained, a motion sensor 2. The other components which are shown in FIG. 4 can either be hardware components being separate components and/or being integrated into the processing unit. Alternatively, the units can also be processing steps performed by the processing unit 4. The processing unit 4 specifically is enabled to carry out a computer program product stored on a readable storage medium, wherein said computer program product comprises said processing steps.

The motion sensor 2 acquires motion detection data 102 indicating the motion of the system, preferably of the imaging device 20 during the exposure time. The motion detection data 102 are submitted to a motion data converter 11, which converts the raw output data of the motion sensor 2 into motion path values indicating a motion path. Such values in the present case are degrees per axis. However, depending on the used coordinate axis, degrees, length indications or other type of motion path values can be obtained.

The motion path values 111 by the motion data converter 11 are submitted to a projecting unit 12. The projecting unit projects the motion path values onto the image sensor 6. This projecting step according to the preferred embodiment bases on the assumption that the sensor plane is lying within the roll axis. However, as previously explained, also any other type of coordinate system can be used with different positions of the image sensor 6 within the imaging device 20. More concretely, the projecting unit 12 projects a three dimensional motion path onto the two dimensional sensor plane thereby obtaining a two dimensional motion path value on the image sensor 6.

The projected values are submitted to an integrating unit 14, which carries out an integrating operation of the projected motion path values as will be explained later on. In a preferred embodiment a size estimator 13 is also provided for estimating the size of the point spread function and submitting the estimated size 113 also to the integrating unit 14 which uses the estimated size as well as the projected motion path values to obtain an initial estimate of a point spread function.

The integrating unit 14 hereby integrates for each sensor pixel the projected motion path values over time, whereby said integrated value for each sensor pixel represents or results in the initial estimate of the point spread function. In other words, an initial estimate of the point spread function is obtained by defining for each pixel as point spread function value the integrated value. That means that during the motion of the system 10 or the imaging device 20, on each axis a same value may be measured several times. Correspondingly, motion path data will be projected several times onto the same pixel. Therefore, for each pixel the motion path data are integrated over time to obtain a value indicating the sum of all motion path values for this one pixel, i.e. indicating how many times the motion path when projected onto sensor plane, passes or is projected onto each pixel. Then, for each pixel said integrated value represents the initial estimate of the point spread function.

This initial estimate of the point spread function can already be used as point spread function in case that due to limited processing capacities no further processing is advisable. However, according to a preferred embodiment, the initial estimate of the PSF is further processed to obtain a final PSF.

The initial estimate of the point spread function 114 is submitted to a normalizing and centering unit 15, which normalizes the initial estimate of the point spread function, so that the sum of all values equals one, and further centers the initial estimate of the point spread function so that the maximum lies in the center of the PSF. The final point spread function 115 is then submitted to a deblurring unit 16. Also the taken blurred image 100 is submitted to the deblurring unit 16, which carries out a deblurring, i.e. a deconvolution of the image 100 using the final point spread function 115. The deblurring unit 16 then outputs a deblurred image 116.

The steps for obtaining the PSF from the motion path values by projecting the motion path values onto this image sensor 6 and integrating them as well as the use of the estimated PSF size will be explained in more detail with reference to FIG. 5.

Figure 5:
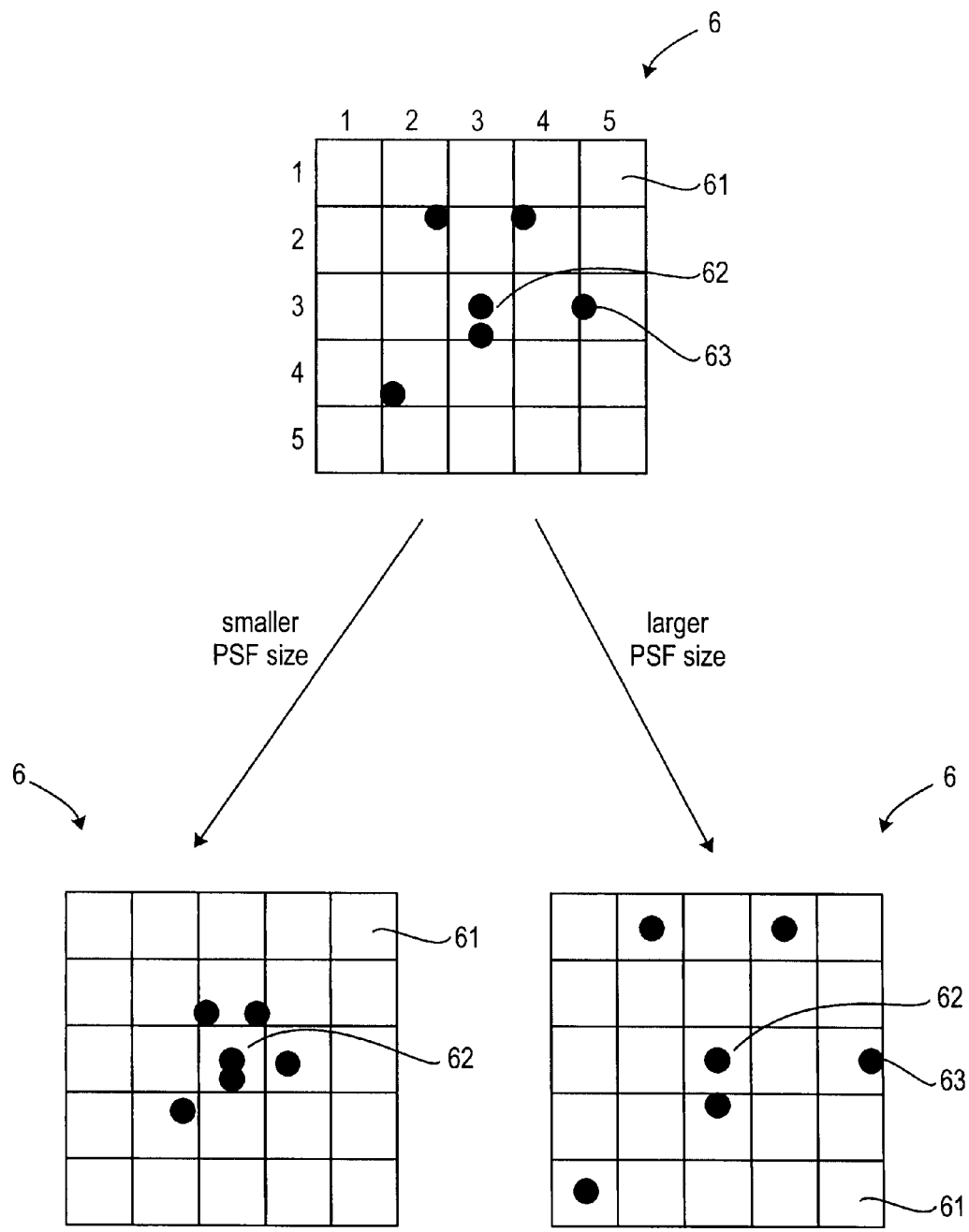
FIG. 5 shows different embodiments of an obtained point spread function depending on the estimated point spread function size.

On the upper part of FIG. 5 schematically an image sensor 6 is shown having as example 5×5 pixels. It is to be understood, that this represents only a schematic example of an image sensor and the present invention can be adapted to any type of image sensor having an arbitrary number of pixels.

In FIG. 5, the lines and columns of pixels are indicated with numbers 1 to 5 in order to enable a unique identification of the different pixels. The pixels 61 are indicated as squares. The center pixel 62 corresponds to the pixel on position (3,3). The dots schematically indicate the motion path values 63 which are projected onto the sensor plane. For the sake of clarity in the present case only very few motion path values 63 are shown, however it is clear that with the present invention much more motion path values are present, which may also overlap, which is not shown in FIG. 5 for the sake of clarity.

After the motion path values 63 are projected onto the image sensor 6, for each pixel 61 the motion path values are integrated over time. In the example shown in the upper image of FIG. 5 there are two motion path values 63 within the center pixel 62. The center pixel 63 thus would obtain an integrated value of 2. The remaining pixels as can be seen from FIG. 5 will either obtain a value of 1 or a value of 0, since within the other pixels there is one motion path value 63 or no motion path value.

The initial estimate of the point spread function value for each pixel of the sensor is thus represented by the corresponding integrated value. In the upper example in FIG. 5 an initial estimate of the PSF would be obtained having for the center pixel a value of 2 and having for four other pixels a value of 1. As previously mentioned, in the present invention the initial estimate of the PSF is preferably normalized, so that the sum of all values equals to one. In the present example, the center pixel 62 would obtain a final PSF value of 0.333 and the other four pixels each would obtain a value of 0.167.

However, depending on the camera properties and/or the distance of the object 25 to the imaging device 20, a point spread function with a different size has to be used. This is due to the fact that with the same movement of the system 10 or of the imaging device 20 an object which is nearer becomes more blurred than an object which is further away.

The size of the point spread function indicates the relation between the motion path values and the sensor pixels, i.e. indicates a relation of the parameter indicating the motion path value and the number of pixels. In case that the motion path values are for example measured in degree per axis, the PSF size indicates the relation between the degree and the number of pixels. It can for example be defined that two degrees correspond to one pixel, i.e. a motion of two degrees is projected onto one pixel.

This becomes even more clear with reference to the lower right image in FIG. 5 which is indicated with larger PSF size. With a larger PSF the motion path values are more spread when projected onto the image sensor 6, so that the PSF is larger. In this case as can be seen, for example the center pixel 62 will only obtain an integrated value of 1. On the other hand, on the left lower image on FIG. 5, where the smaller PSF size is used, it can be seen that the center pixel 62 again obtains a value of 2, whereas the pixel above the center pixel in column 3, line 2 also obtains a value of 2. In contrast to the upper image in FIG. 5, the pixel above the center pixel has obtained a value of 0.

Since with the PSF size the position of the motion path values when projected on the sensor plane and correspondingly the integrated value is changed, with the PSF size also the obtained initial estimate of the PSF and final PSF is changed.

The PSF size is estimated by measuring the distance of the image sensor 6 to the object 25 in focus. This distance can be obtained from the lens parameters and the focus.

More concretely, the PSF size depends on the chosen lens and its settings like focal length, focal distance, angle of view and so on. For a camera having a fixed focus or autofocus, an algorithm can be provided and programmed with the correct settings to determine the PSF size from the lens parameters and focus. Alternatively, a look up table can be provided, from which depending on the current lens parameters and focus the corresponding PSF size can be read.

In the present invention, the PSF size was obtained by reading the lens parameters and it was measured experimentally for confirmation. In the following the calculation of the PSF size will be explained in more detail.

The lens behaviour can be modelled with a formula. The formula for the calculation of the size of the blur, i.e. the PSF size, that was obtained for a specific camera is as follows:

$$PSFsize = (resolution/ss) * ((-1.0/5831875.0)*fd*fd + (-1251.0/233275.0)*fd + (1816580.0/93310.0)) * \sin(maxDeg)$$

Hereby, 'fd' is the distance of the point light source and the point of rotation, 'maxDeg' is the maximum degree of rotation of the system 10 or the imaging device 20, 'resolution' is the number of pixels and 'ss' is the size of the sensor.

The first part of the formula (involving 'resolution' and 'ss') is used to include the effect of different pixel resolution and the sensor size.

The second part of the formula (involving fd) is dependent on the optical properties of the lens and is derived in the following way: a point light source is set up in front of the camera at a known distance. The camera is rotated while triggering it with a known motion to obtain the image of the blurred point source. The size of the blur can be obtained by measuring the size of the blurred point source. This process is repeated with three different distances, which makes it possible to find a quadratic polynomial (obtained by polynomial fitting).

The third part of the formula (involving maxDeg) is derived using trigonometry (Pythagoras theorem).

Even though the present example was explained with reference to a second order polynomials, the present invention can also be extended to higher order polynomials.

Figure 6:
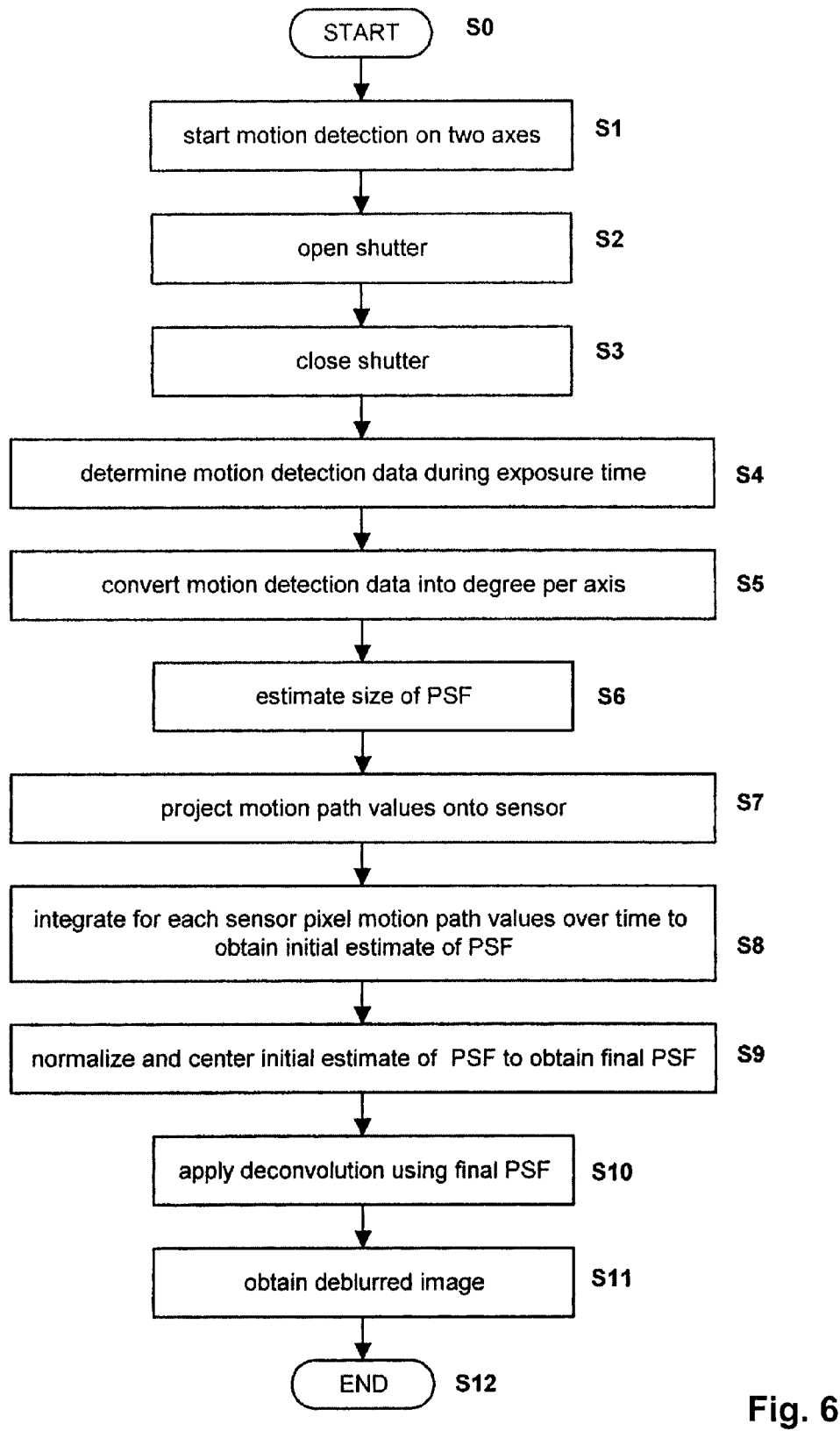
FIG. 6 shows a flowchart showing the process steps of the method according to the present invention.

The steps of the process are further shown with reference to FIG. 6.

The process begins in step S0, for example with a command triggering the capturing of an image. In step S1 the motion detection by the motion sensor 2 is started on at least one axis. In the next step S2 the shutter 3 is opened and in step S3 the shutter is closed. In step S4 the motion detection data obtained by the motion sensor 2 during the exposure time is determined. These motion data then by the motion data convertor 11 are converted into degree per axis in the case of measuring motion data along pitch and yaw axis.

In the next step S6 the size of the PSF is estimated using the lens information and/or other information as previously described indicating the distance of the object.

In the next step S7 the motion path values are projected onto the image sensor plane 6. In step S8 for each pixel the motion path values are integrated over time in order to obtain the values of the initial estimate of the point spread function.

In step S9 the initial estimate of the point spread function is normalized and centered to obtain the final PSF.

In step S10 a deconvolution is applied to the blurred image 100 using the final PSF. In step S11 the deblurred image 116 is obtained and output and in step S12 the process ends.

With the present invention thus the motion path and the values of the PSF are obtained by integrating the motion path values derived from the motion sensor. Preferably, the size of the point spread function is estimated by taking the data from the motion sensor and the lens information including the distance of the focal object into account.

The present invention thus proposes a very simple and effective method of obtaining a point spread function using motion information.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A method for obtaining a point spread function for deblurring image data captured by an imaging device comprising a motion sensor, the method comprising the steps of:
   acquiring motion path values indicating motion of the imaging device during an exposure time;
   projecting the motion path values of the imaging device onto a plane of an image sensor including a plurality of pixels;
   integrating for each image sensor pixel the projected motion path values over time, the integrated value for each image sensor pixel representing an initial estimate of the point spread function; and
   obtaining a final point spread function by normalizing and centering the initial estimate of the point spread function.

2. The method according to claim 1, further comprising the steps of:
   using a pitch-yaw-roll coordinate system;
   defining the roll-axis as lying within the plane of the image sensor; and
   acquiring the motion path values along a pitch- and yaw-axis.

3. The method according to claim 1 or 2, further comprising the step of:
   estimating the size of the point spread function based on distance between the image sensor and a focused object.

4. The method according to claim 3, wherein the step of estimating the size of the point spread function comprises:
   estimating the size based on parameters of an optical system based on focal distance, focal length and/or angle of view.

5. The method according to claim 3, further comprising the step of:
   setting for the projecting step the relation between motion path values and image sensor pixels depending on the estimated size.

6. A computer readable non-transitory medium having instructions stored thereon which, when carried out on a computer, cause the computer to perform the steps of the method as claimed in claim 1.

7. A system for obtaining a point spread function for deblurring image data, the system comprising:
   a motion sensor configured to acquire motion path values indicating the motion of the system during the exposure time; and
   circuitry configured to
      project the motion path values of the system onto a plane of an image sensor including a plurality of pixels;
      integrate for each image sensor pixel the projected motion path values over time, the integrated value for each image sensor pixel representing an initial estimate of the point spread function; and
      obtain a final point spread function by normalizing and centering the initial estimate of the point spread function.

8. The system according to claim 7, wherein the motion sensor is a gyroscope, accelerometer and/or magnetic sensors.

9. The system according to claim 7 or 8,
   wherein the motion path values are obtained based on a pitch-yaw-roll coordinate system, whereby the roll-axis is defined as lying within the plane of the image sensor, and
   the motion sensor is configured to acquire the motion path values along a pitch- and yaw-axis.

10. The system according to claim 7 or 8, wherein the circuitry is further configured to:
    estimate the size of the point spread function based on distance between the image sensor and a focused object.

11. The system according to claim 10, wherein the circuitry is further configured to:
    estimate the size based on parameters of an optical system based on focal distance, focal length and/or angle of view.

12. The system according to claim 10, wherein the circuitry is further configured to:
    set the relation between motion path values and image sensor pixels depending on the estimated size.

13. A camera, comprising a system for noise reduction according to claim 7.

14. A system for obtaining a point spread function for deblurring image data captured by an imaging device comprising a motion sensor, the system comprising:
- means for acquiring motion path values indicating the motion of the imaging device during the exposure time;
- means for projecting the motion path values of the imaging device onto a plane of an image sensor including a plurality of pixels;
- means for integrating for each image sensor pixel the projected motion path values over time, the integrated value for each image sensor pixel representing an initial estimate of the point spread function; and
- means for obtaining a final point spread function by normalizing and centering the initial estimate of the point spread function.

* * * * *